United States Patent
Kwon

[19]

[11] Patent Number: 6,012,097
[45] Date of Patent: Jan. 4, 2000

[54] INTER-PROCESSOR COMMUNICATION MESSAGE ROUTER FOR USE IN AN ELECTRONIC SWITCHING SYSTEM

[75] Inventor: Hwan-Woo Kwon, Incheon, Rep. of Korea

[73] Assignee: Daewoo Telecom, Ltd., Incheon, Rep. of Korea

[21] Appl. No.: 08/960,338

[22] Filed: Oct. 29, 1997

[30] Foreign Application Priority Data

Dec. 23, 1996 [KR] Rep. of Korea ................... 96-70622

[51] Int. Cl.[7] ............................. G06F 13/00; H04L 12/56
[52] U.S. Cl. ........................... 709/238; 370/382; 370/392
[58] Field of Search .................................. 709/218, 236, 709/238, 245, 249, 250; 370/390, 392, 400, 401, 382, 389

[56] References Cited

U.S. PATENT DOCUMENTS

| | | | |
|---|---|---|---|
| 4,792,947 | 12/1988 | Takiyasu et al. | 370/452 |
| 5,386,413 | 1/1995 | McAuley et al. | 370/392 |
| 5,432,782 | 7/1995 | Suzuki | 370/419 |
| 5,477,547 | 12/1995 | Sugiyama | 370/401 |
| 5,790,542 | 8/1998 | Kim et al. | 370/392 |

*Primary Examiner*—Zarni Maung
*Assistant Examiner*—Viet Vu
*Attorney, Agent, or Firm*—Pennie & Edmonds LLP

[57] ABSTRACT

An IPC (Inter-Processor Communications) message router for use in routing an IPC message to a node comprises: a memory for storing receive enable signals at addresses therein, each of the addresses being identical to a routing address included in the IPC message, and outputting receive enable signals stored in the addresses corresponding to the routing address; and a converter and sync signal generator for extracting a routing address from a serial IPC message received, converting the serial routing address into a parallel routing address, sending the parallel routing address to the memory, and generating a sync signal, the sync signal being used in selecting a set of receive enable signals.

14 Claims, 6 Drawing Sheets

FIG. 7A

| ADDRESS | DATA |
|---|---|
| $(0000)_{16}$ | 1111  1111  1111  1110 |
| $(0001)_{16}$ | 1111  1111  1111  1101 |
| $(0002)_{16}$ | 1111  1111  1111  1011 |
| ⋮ | ⋮ |
| $(000F)_{16}$ | 0111  1111  1111  1111 |

FIG. 7B

| ADDRESS | DATA |
|---|---|
| $(0010)_{16}$ | 1111  1111  1111  1100 |
| $(0011)_{16}$ | 1111  1111  1111  1001 |
| $(0012)_{16}$ | 1111  1111  1111  0011 |
| ⋮ | ⋮ |
| $(001F)_{16}$ | 0011  1111  1111  1111 |

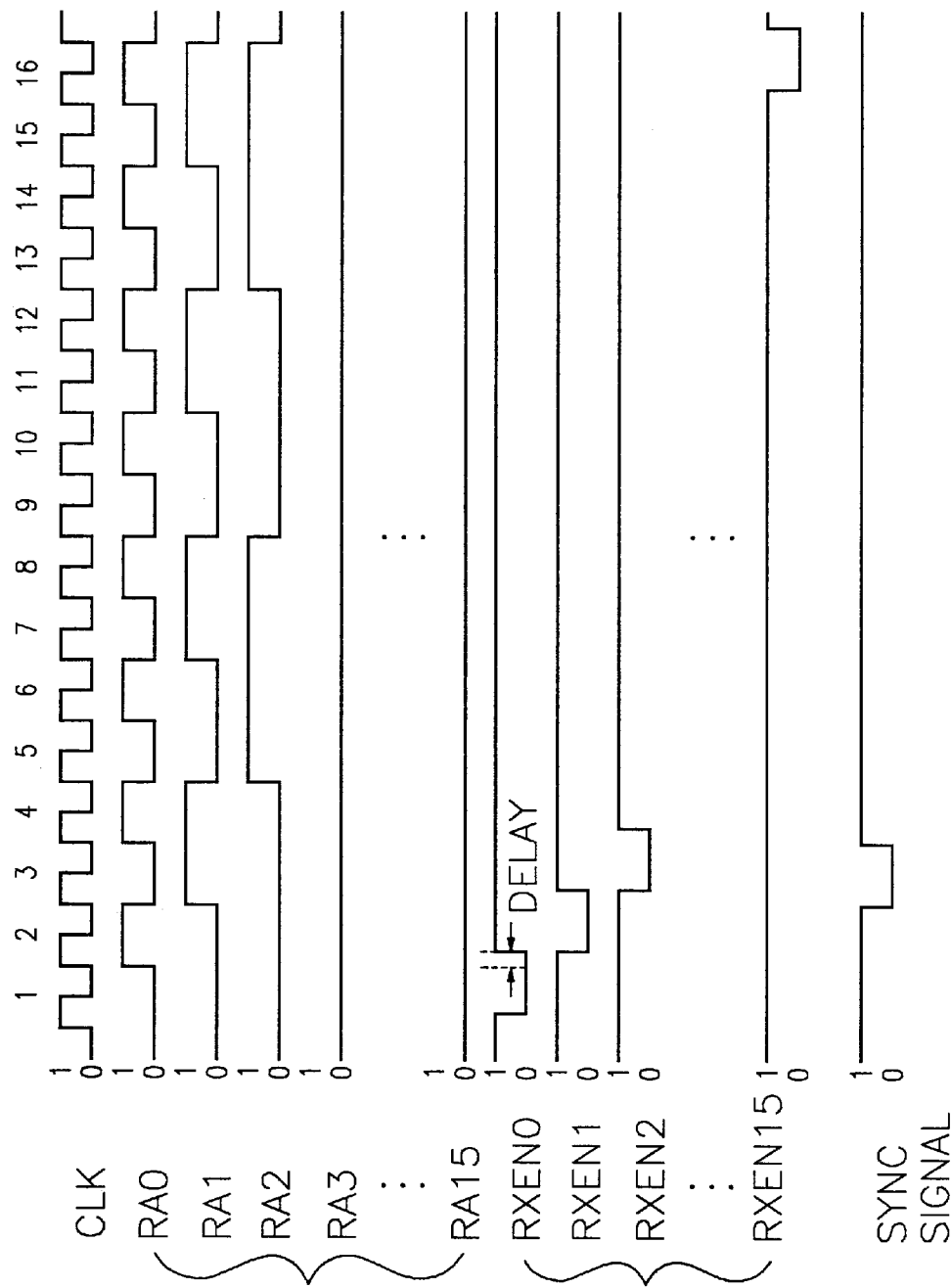

INTER-PROCESSOR COMMUNICATION MESSAGE ROUTER FOR USE IN AN ELECTRONIC SWITCHING SYSTEM

FIELD OF THE INVENTION

The present invention relates to an electronic switching system; and, more particularly, to an inter-processor communications message router using a memory device.

BACKGROUND OF THE INVENTION

A distributed control architecture is a state-of-the-art control architecture for use in an ESS (Electronic Switching System), wherein a number of processors performing a variety of functions are involved and practical and useful cooperations between the processors are achieved by using a so-called IPC (Inter-Processor Communications) network.

For an efficient inter-processor communications system based on the IPC network, there are employed nodes at some intermediate points of the IPC network in order to route and arbitrate a data flow between the processors. To each of the nodes, an independent and unique node address is assigned.

An IPC message format, as shown in FIG. 1, is used for carrying data exchanged between the nodes. The IPC message format comprises sectors such as a SF (start flag), a routing address, IPC data, a CRC (cyclic redundancy check) and an EF (end flag).

The SF and the EF are reserved for indicating the start and the end of the IPC message format, respectively. The routing address is allocated for carrying a node address to which the IPC message format is to be finally delivered. The IPC data refers to the contents of the message that a sending processor wants to deliver to a receiving processor. The CRC represents a sector for carrying CRC data conforming to a well-known CRC test.

Typically, one byte for each of the SF and the EF, and two bytes for each of the routing address and the CRC may be allocated. The size of the IPC data may vary.

A conventional IPC message router is shown in FIG. 2. The conventional router fundamentally compares a node address and a routing address in order to generate a receive enable signal (RXEN), wherein the RXEN is a one bit logic signal determining whether a node accepts or rejects the IPC data incoming therefor. Details on the conventional router will be described by reference to FIG. 2 to FIG. 4.

Referring to FIG. 2, the node address and the routing address are compared in a bit-by-bit fashion within an address comparator 20. The node address is designed to come either from a processor in charge of supervising the IPC or from a wire strap which provides node addresses for the nodes involved in the IPC. The routing address, as stated above, may be extracted from the IPC message. The node address is an address uniquely assigned to each node. The routing address, as stated above, represents a node address to which the IPC message is to be eventually delivered. A mode selector may consist of 3 bits, and is used for determining the comparison pattern performed in the address comparator 20. The address comparator yields logic "0" for the RXEN if the two addresses are matched; logic "1" for the RXEN if the two addresses are not matched.

The comparison is performed by using sixteen XOR (exclusive OR) gates 31 to 32 and an OR gate 33 as illustrated in FIG. 3. Each XOR gate compares each digit of the addresses. The output of the XOR gate is logic "0" when the two inputs are identical and logic "1" otherwise. If all the bits are matched, all the XOR gates produces logic "0". ORing the outputs of the XOR gates yields logic "0" only if all the digits are matched, that is, the RXEN is logic "0". When the RXEN is logic "0", the IPC message is accepted by the node having the node address compared.

The above mentioned comparison should be performed for every node involved.

In order for the conventional router to support the so-called "multi-cast routing", casting the IPC message to more than one node at the same time, the conventional router ought to be equipped with exceedingly complicated logic devices. This can be a significant drawback.

Further, if yielding the RXEN is not completed within one period of a CLK (system clock), e.g., the interval between t1 and t2 shown in FIG. 4, the IPC message itself must be delayed. More specifically, a delay from time t1 when the comparison is initiated as shown in FIG. 4 is extended over time t2, a stream of IPC messages must be delayed by one or more clocks so as not to cause loss in the IPC messages. Dealing with the delay of IPC messages, however, exacts additional resources and extra cost.

SUMMARY OF THE INVENTION

It is, therefore, a primary object of the present invention to provide a simple and reliable inter-processor message router without causing an inter-processor communications message delay problem.

In accordance with the present invention, there is provided an IPC (Inter-Processor Communications) message router for use in routing an IPC message to a node, the node being assigned a unique node address, the router comprising: a memory for storing receive enable signals at addresses therein, each of the addresses being identical to the routing address included in the IPC message, and outputting receive enable signals stored in the addresses in response to the routing address, wherein each of the receive enable signals is used in enabling a node corresponding thereto to accept the IPC message; and a converter and sync signal generator for extracting a routing address from a received serial IPC message, converting the serial routing address into a parallel routing address, sending the parallel routing address to the memory, and generating a sync signal, the sync signal being used in selecting a set of receive enable signals.

BRIEF DESCRIPTION OF THE DRAWINGS

The above and other objects and features of the present invention will become apparent from the following description of preferred embodiments given by reference to the accompanying drawings, in which:

FIGS. 7A and 7B exemplify stored data in the memory shown in FIG. 5; and

FIG. 8 represents a timing chart of some signals of the inventive router.

DETAILED DESCRIPTION OF THE PREFERRED EMBODIMENT

Figure 1:
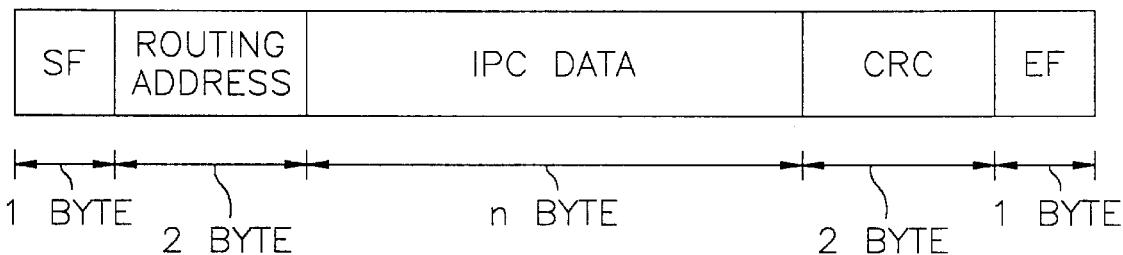
FIG. 1 describes an IPC message format.
Figure 2:
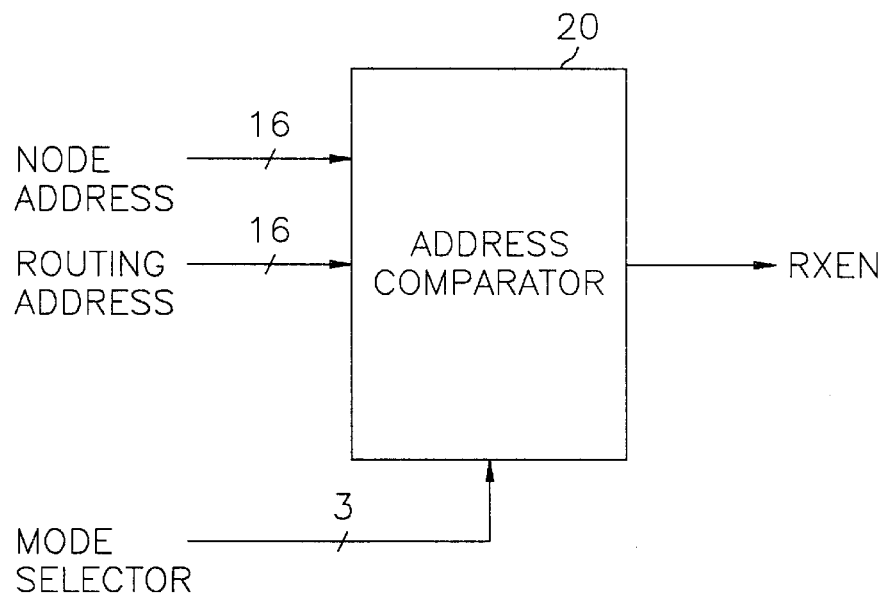
FIG. 2 illustrates a conventional IPC message router.
Figure 3:
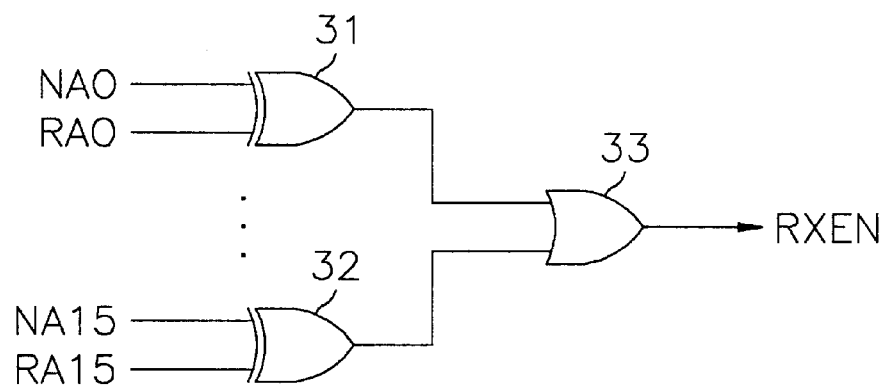
FIG. 3 depicts details of the address comparator shown in FIG. 2.
Figure 4:
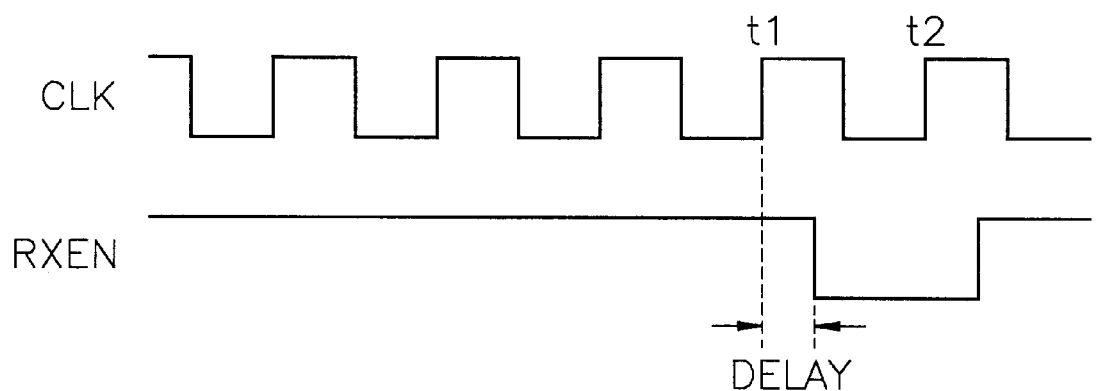
FIG. 4 shows a timing chart of a system clock and a receive enable signal according to the conventional router.
Figure 5:
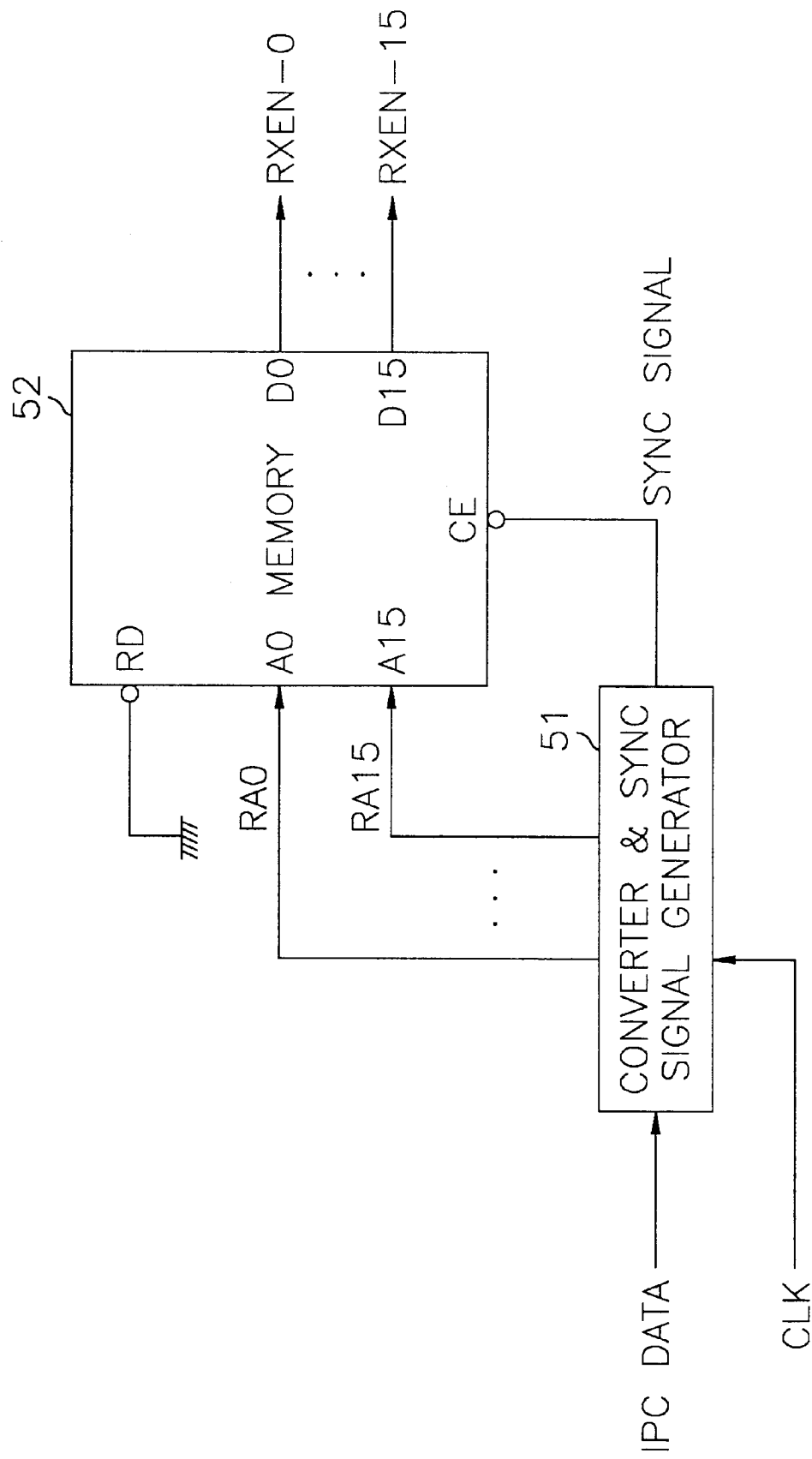
FIG. 5 provides an inventive IPC message router.

Referring to FIG. 5, there is illustrated an IPC message router in accordance with the present invention.

An IPC message, a serial bit stream, enters a converter & sync signal generator 51 along with a system clock. The converter & sync signal generator 51 extracts a routing address recorded after a SF (start flag) in the incoming IPC message format and converts the serial bit stream of the routing address into a parallel routing address.

The converted parallel routing address is inputted to a memory 52. Custom ICs (Integrated circuits) such as RAM (Read Access Memory), PROM (Programmable Read-Only Memory), EPROM (Erasable Programmable Read-Only Memory) and DPRAM (Dual Port Read Access Memory) can be applied in place of the memory 52.

Figure 6A:
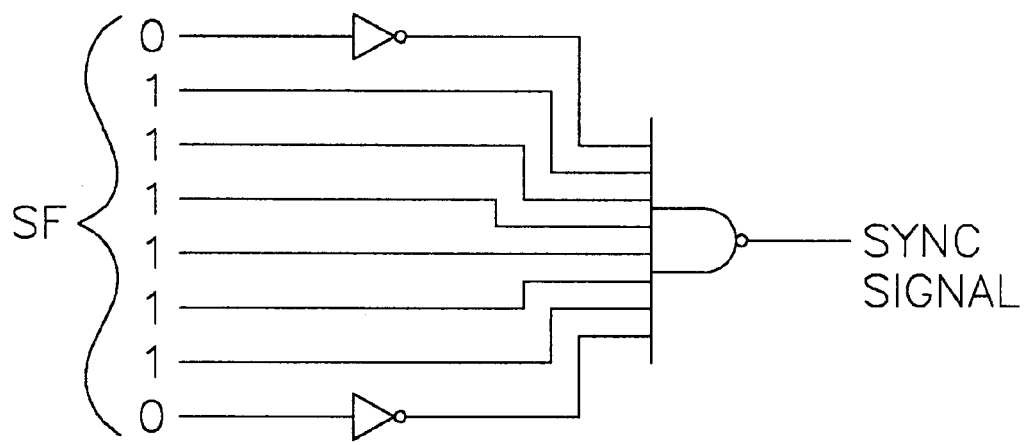
FIGS. 6A and 6B offer logic devices generating a sync signal.
Figure 6B:
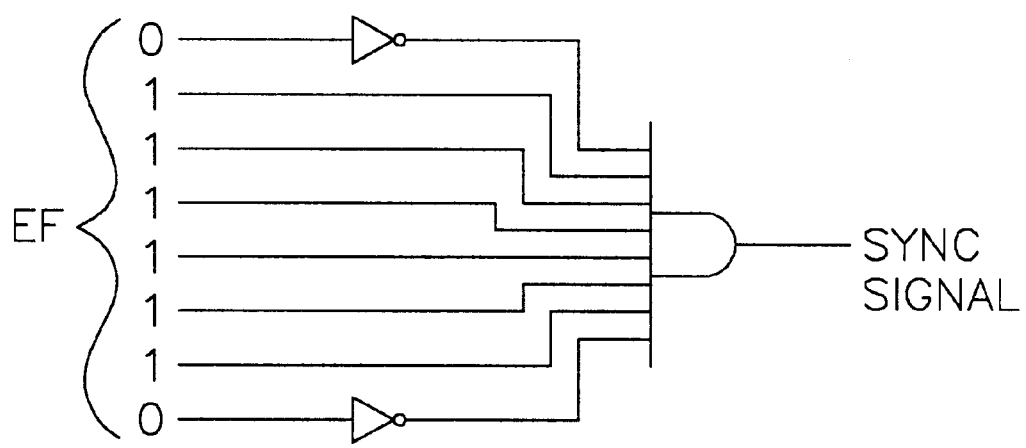

Referring to FIG. 6A, a sync signal is generated in the converter & sync signal generator 51 by using the SF and the EF. Each of the SF and the EF is designed to be assigned a value of $(7E)_{16}$, i.e., 0111 1110. As shown in FIG. 6A, a resultant sync signal "0" is produced by NANDing "1"s and output of inverted "0"s, both included in the SF. This sync signal is fed to the memory to enable the memory 52. On the other hand, referring to FIG. 6B, by using the EF emerging after a CRC (cyclic redundancy check), the sync signal becomes "1". The sync signal of value "1" disables the memory 51.

It is designed that the parallel routing address can be immediately used as an address of the memory 52. In the address to which the parallel routing address designates, there is stored data corresponding to the output of the memory 52, i.e., RXEN-0 to RXEN-15.

Referring to FIG. 7A for more detail, there is shown an exemplary address map of the memory 52.

When the parallel routing address is $(0000)_{16}$, the output of the memory, D15 to D0 is 1111 1111 1111 1110; when the parallel routing address is $(0001)_{16}$, the output of the memory, D15 to D0 is 1111 1111 1111 1101, and the like. The D15 to D0 correspond to RXEN-15 to RXEN-0, respectively, and, therefore, node 0 can accept the IPC message when the parallel routing address is $(0000)_{16}$; node 1 can accept the IPC message when the parallel routing address is $(0001)_{16}$, and the like.

By reference to FIG. 7B, exemplary addresses and data of other area within the memory 52 are given.

When the parallel routing address is $(0010)_{16}$, the output of the memory, D15 to D0 is 1111 1111 1111 1100; when the parallel routing address is $(0011)_{16}$, the output of the memory, D15 to D0 is 1111 1111 1111 1001, and the like.

Likewise, node 0 and node 1 accept the IPC message when the parallel routing address is $(0010)_{16}$; node 1 and node 2 can accept the IPC message when the parallel routing address is $(0011)_{16}$, and the like. It is called "multi-cast routing" to cast the IPC message to more than one nodes at the same time. In a similar pattern, any combination of multi-cast routing can be achieved by using a memory map as described in the above.

The system clock typically is around 20 MHz to 30 MHz, which tells the period of the system clock is 50 ns to 33 ns; whereas, a memory access time is below 15 ns. This suggests that delay at the IPC message router in accordance with the present invention causes no problem of delaying the IPC message.

The RXEN signals are outputted from the memory 52 while the sync signal (synchronization signal) remains logic "0". Referring to FIG. 8, there are shown timing charts of several signals appearing on the inventive router, based on the memory map of FIG. 7A.

Referring to interval 1, logic values of RA0 to RA15 are all "0", which denotes that RXEN-0 is "0" and the other RXENs are "1". It is presumed that node 0 alone can accept the IPC message. In this case, however, node 0 cannot accept the IPC message since the sync signal remains to be "1".

In case of interval 3, logic values of RA0 to RA15 0100 0000 0000 0000. That denotes that RXEN-2 is "0" and the other RXENs are all "1". Node 3 can accept the IPC message since the sync signal is "0" at interval 3.

In view of foregoing, it is obvious that the inventive IPC message router can support any combination of multi-cast routing, not to mention an individual routing.

It is also obvious that the inventive router causes no problem of delaying the IPC message.

Further, adapting to any change in routing scheme, e.g., change of node addresses or change of number of nodes employed, can be supported by simply altering the memory map, even during an on-going operation of the ESS, without changing hardware.

While the present invention has been described with respect to the preferred embodiments, other modifications and variations may be made without departing from the scope and spirit of the present invention as set forth in the following claims.

What is claimed is:

1. A multi-cast IPC (Inter-Processor Communications) message router for use in simultaneously routing an IPC message to one or more nodes, the router comprising:

means for extracting a routing address from the IPC message and generating a sync signal; and a memory for storing multiple sets of receive enable signals at addresses therein, the routing address corresponding to one of the addresses in the memory, at which said one set of receive enable signals is stored, each receive enable signal of the set being associated with each node, and sending each receive enable signal of the set to each corresponding node in response to the sync signal, wherein one or more receive enable signals of the set correspond to first nodes, which the IPC message is destined for, while the remaining receive enable signals of the set correspond to second nodes, which the IPC message is not destined for, said one or more receive enable signals being set to enable the first nodes and the remaining receive enable signals being set to disable the second nodes.

2. The IPC message router of claim 1, wherein the sync signal is used for enabling and disabling the memory.

3. The IPC message router of claim 1, wherein the sync signal is generated by using a SF (Start Flag) and an EF (End Flag), the SF and the EF being data included in the IPC message to indicate the start and the end of the IPC message, respectively.

4. The IPC message router of claim 1, wherein a change in a routing scheme is carried out by altering the stored receive enable signals in the memory, wherein the routing scheme refers to a design factor of an IPC network.

5. The IPC message router of claim 4, wherein the memory is a RAM, a PROM, an EPROM or a DPRAM.

6. An electronic switching system having an IPC (inter-processor communications) network and a multi-cast IPC message router therein for use in simultaneously routing an IPC message to one or more nodes, characterized in that the IPC message router comprises:

means for extracting a routing address from the IPC message and generating a sync signal; and a memory for storing multiple sets of receive enable signals at addresses therein, the routing address corresponding to one of the addresses in the memory, at which said one set of receive enable signals is stored, each receive enable signal of the set being associated with each node, and sending each receive enable signal of the set to each corresponding node in response to the sync signal, wherein one or more receive enable signals of the set correspond to first nodes, which the IPC message is destined for, while the remaining receive enable signals of the set correspond to second nodes, which the IPC message is not destined for, said one or more receive enable signals being set to enable the first nodes and the remaining receive enable signals being set to disable the second nodes.

7. The electronic switching system of claim 6, wherein the sync signal is used for enabling and disabling the memory.

8. The electronic switching system of claim 7, wherein the sync signal is generated by using a SF (Start Flag) and an EF (End Flag), the SF and the EF being data included in the IPC message to indicate the start and the end of the IPC message, respectively.

9. The electronic switching system of claim 8, wherein a change in a routing scheme is carried out by altering the stored receive enable signals in the memory, wherein the routing scheme refers to a design factor of an IPC network.

10. The electronic switching system of claim 9, wherein the memory is a RAM, a PROM, an EPROM or a DPRAM.

11. A multi-cast IPC (Inter-Processor Communications) message router for use in mapping an IPC message to a set of nodes, said message router comprising:

a converter and sync signal generator having a serial data input, a parallel data output and a signal output, said converter and sync signal generator configured to receive an IPC routing address formatted in a serial bit stream via said serial data input, and output parallel address information at said parallel data output and also output a sync signal via said signal output, all based on information in said serial bit stream; and a memory device comprising a plurality of address inputs connected to said parallel data output of said converter and sync signal generator, a memory device enable input connected to said signal output of said converter and sync signal generator, a plurality of memory locations indexable by said address inputs, and a plurality of memory data outputs, said plurality of memory locations having stored therein a plurality of bits, each bit representing node enable data for a particular node, a first bit value for said particular node representing that said particular node is to be enabled, and a second bit value for said particular node representing that said particular node is to be disabled, wherein upon receipt of both parallel address information and a sync signal, said memory device outputs contents of an addressed memory location corresponding to said parallel address information onto said memory data outputs, whereby a first number of nodes are simultaneously enabled and a second number of nodes are simultaneously disabled in accordance with contents of said addressed memory location.

12. The multi-cast IPC message router according to claim 11, wherein the sync signal is generated by using a SF (Start Flag) and an EF (End Flag), the SF and EF being data included in the IPC message to indicate a start and an end of the IPC message, respectively.

13. The multi-cast IPC message router according to claim 11, wherein contents of said memory locations within said memory device are configured to be changed to alter a routing scheme of an IPC network.

14. The multi-cast IPC message router according to claim 11, wherein said memory device is one of a group consisting of a RAM, a PROM, an EPROM and a DRPAM.

* * * * *